(12) United States Patent
Wong et al.

(10) Patent No.: US 12,344,448 B2
(45) Date of Patent: Jul. 1, 2025

(54) VENTING DEVICE, LID, AND CONTAINER COMPRISING LID

(71) Applicants: Master Plans LLC, Dover, DE (US); Siu Wah Wong, Hong Kong (HK)

(72) Inventors: Siu Wah Wong, Hong Kong (HK); Yi Chia Chen, Taipei (TW); Szu Wen Wang, Taipei (TW); Tsan Ho Chan, Hong Kong (HK)

(73) Assignee: Master Plans LLC, Dover, DE (US)

( * ) Notice: Subject to any disclaimer, the term of this patent is extended or adjusted under 35 U.S.C. 154(b) by 38 days.

(21) Appl. No.: 17/904,616

(22) PCT Filed: Feb. 20, 2020

(86) PCT No.: PCT/IB2020/051408
§ 371 (c)(1),
(2) Date: Aug. 19, 2022

(87) PCT Pub. No.: WO2021/165723
PCT Pub. Date: Aug. 26, 2021

(65) Prior Publication Data
US 2023/0107675 A1    Apr. 6, 2023

(51) Int. Cl.
*B65D 51/16* (2006.01)
*A47G 19/22* (2006.01)
*F16K 15/14* (2006.01)

(52) U.S. Cl.
CPC ..... *B65D 51/1672* (2013.01); *A47G 19/2272* (2013.01); *F16K 15/144* (2013.01)

(58) Field of Classification Search
CPC ............ B65D 51/1672; A47G 19/2272; F16K 15/144
See application file for complete search history.

(56) References Cited

U.S. PATENT DOCUMENTS
7,097,065 B2    8/2006  Yoneoka et al.

FOREIGN PATENT DOCUMENTS
CN    2811185 Y    8/2006
CN    1951771 A    4/2007
(Continued)

*Primary Examiner* — Angelisa L. Hicks
(74) *Attorney, Agent, or Firm* — Hawkinson Yang LLP

(57) ABSTRACT

A venting device comprises an air channel and a rotary venting rod, wherein: the air channel comprises a first end facing an outer surface of the rotary venting rod and a second end away from the rotary venting rod; the outer surface of the rotary venting rod is provided with a recessed venting slot in fluid communication with ambient air, about which the rotary venting rod may be rotated about a rotation axis extending longitudinally thereof to provide a vented state and a sealed state. In the vented state, at least a portion of the venting slot of the rotary venting rod is in fluid communication with the air channel and thereby brings the air channel into fluid communication with ambient air via the venting slot. In the sealed state, the venting slot of the rotary venting rod is not in fluid communication with the air channel and the first end of the air channel is sealed by the outer surface of the rotating vent rod. The venting device of the present invention is easy to manufacture and assemble. The present invention also relates to a lid comprising the above-mentioned venting device and a container comprising the lid.

6 Claims, 9 Drawing Sheets

(56) References Cited

FOREIGN PATENT DOCUMENTS

| | | | |
|---|---|---|---|
| CN | 101767676 | A | 7/2010 |
| CN | 202219902 | U * | 5/2012 |
| CN | 103640780 | A | 3/2014 |
| CN | 103640781 | A | 3/2014 |
| JP | 33008190Y1958 | | 5/1958 |
| JP | 2001039458 | A | 2/2001 |
| JP | 2004345742 | A | 12/2004 |
| JP | 2005289388 | A | 10/2005 |
| JP | 2007320618 | A | 12/2007 |
| JP | 4270622 | B2 * | 6/2009 |
| JP | 4518595 | B | 8/2010 |
| JP | 2013173542 | A | 9/2013 |
| JP | 5354040 | B | 11/2013 |
| JP | 5375932 | B | 12/2013 |
| JP | 2017030812 | A | 2/2017 |
| TW | I504544 | B | 10/2015 |

* cited by examiner

VENTING DEVICE, LID, AND CONTAINER COMPRISING LID

BACKGROUND

Technical Field

The present invention belongs to the field of general household and consumer goods, and in particular relates to a venting device for a container (such as a beverage container), a lid comprising a venting device that may be used for venting of a container, and a container comprising the venting device. The disclosed venting device may be used in containers such as bottles, cups, jars, boxes, etc., especially children's drinking cups such as duckbill cups.

Background Art

Conventional household containers are often used with a lid that lids a container's internal cavity that accommodates the stored contents. When the lid is closed, the inner chamber of the container may form a relatively sealed space. For example, if a liquid with high fluidity (i.e., low viscosity) is enclosed in a sealed container and the temperature and/or pressure in the inner chamber of the container is relatively high, opening the lid of the container may cause the liquid contents to spray out.

It is known in the art, particularly for children's drinking cups such as duckbill cups, to store beverages in a container with a top opening similar to a drinking cup, and to attach a lid, such as a lid with a drinking opening such as a spout or integrated straw, to the container to prevent leakage. The lid may include a cover that may be closed to obstruct the drinking opening to prevent the liquid from leaking and opened to allow access to the drinking opening that the beverage may be consumed. If such containers are holding a warm liquid, the heat from the liquid can cause the air inside the container to be heated, which in turns increases the pressure inside the container, and can result in the liquid being suddenly sprayed out from the drinking opening when the lid is opened.

Various prior art venting devices for containers have been introduced to try to balance the pressure difference between the interior and exterior of the container during the process of opening the lid. These venting devices are often implemented by a lid and a flexible drinking straw that is hermetically mounted on the opening of the main body of the container. The lid has a rotatable exterior shielding member, a valve for opening and closing the internal flow channel of the container by bending, folding, and extending the drinking straw as the shielding member is rotated, and a venting device provided on the shielding member for opening and closing a vent hole on the lid. The venting device operates in linkage with the opening and closing of the valve, and has a protruding member that opens and closes (unblocks or blocks) the vent hole as the shielding member is rotated. When the shielding member is closed, it is sealed around the drinking straw and the vent hole.

The prior art venting device has a great influence on the structure of the lid, especially the structure of the lid's shielding member, and the engagement of the valve core and the venting hole causes uneven movement of the lid, which increases the difficulty of opening and closing the lid.

SUMMARY OF THE INVENTION

The present invention is directed to solving the above-mentioned technical problems, and has as one object to provide a venting device for a container that is simple in structure and can provides for ease of manufacture and assembly.

Another object of the present invention is to provide a container lid with the venting device that is simple and convenient to take apart for cleaning.

To this end, the present invention provides a venting device, the venting device includes an air channel and a rotary venting rod, wherein:

the air channel comprises a first end facing an outer surface of the rotary venting rod and a second end facing away from the rotary venting rod;

the outer surface of the rotary venting rod is provided with a venting slot that is concave and is in fluid communication with the ambient air, wherein the rotary venting rod may be rotated about its longitudinal axis to provide vented and sealed states.

In the vented state, at least a portion of the venting slot of the rotary venting rod is in fluid communication with the air channel, and thereby causes the air channel to be in fluid communication with the ambient air via the venting slot.

In the sealed state, the venting slot of the rotary venting rod is not in fluid communication with the air channel, and thus the first end of the air channel is blocked by the outer surface of the rotary venting rod.

The venting device of the present invention is simple to manufacture and assemble, and the various functions of the venting device may be accessed through a simple pivoting operation.

According to a preferred embodiment of the venting device of the present invention, the first end of the air channel and the outer surface of the rotary venting rod are separable from each other. Such an arrangement facilitates the separation of the air channel and the rotation of the rotary venting rod, thereby facilitating maintenance and cleaning of the venting device.

According to a preferred embodiment of the venting device of the present invention, the outer surface of the rotary venting rod is cylindrical and the rotation axis of the rotary venting rod is its central axis. The rounded outer surface of the rotary venting rod facilitates smooth rotation of the rotary venting rod, thereby improving the comfort and ease of operating of the venting device. In addition, the rounded outer surface of the rotary venting rod facilitates the sealing effect in the sealed state.

According to a preferred embodiment of the venting device of the present invention, the venting slot extends in the longitudinal direction of the rotary venting rod toward the distal face of the rotary venting rod. The venting slot thus arranged may be more fully in contact with the ambient air and provide a sufficiently long air flow path to prevent the contents of the container from being splashed into the ambient air through the air channels and the venting slot.

According to a preferred embodiment of the venting device of the present invention, the venting slot extends along a portion of the longitudinal direction of the rotary venting rod on the outer surface of the rotary venting rod. This arrangement of the venting slot is beneficial to form a good seal on the air channel, so as to ensure that the contents of the container remain hygienic and are contaminated by the external environment.

According to a preferred embodiment of the venting device of the present invention, the rotary venting rod is hollow, comprising an internal cavity that extends toward the distal face of the rotary venting rod, and the venting slot extends from the outer surface into the internal cavity. The internal cavity provides a relatively large air flow section, which facilitates the air flow through the venting slot and the internal cavity to equalize the pressure inside and outside the container.

According to a preferred embodiment of the venting device of the present invention, the rotation axis of the rotary venting rod is arranged so that it is substantially perpendicular to the channel axis of the air channel at the first end. The vertically arranged air channel and rotary venting rod are beneficial to reduce the space needed for the venting device and to provide a relatively winding air flow path.

The present invention also provides a lid for a container, the lid comprising:

a venting device, the venting device comprising an air channel and a rotary venting rod that rotates around a rotation axis, a swivel cover, wherein the rotary venting rod is arranged on the swivel cover, a concave venting slot is provided on the outer surface of the rotary venting rod, and the venting slot is configured to communicate with the ambient air, a lid base, wherein the air channel is provided on the lid base and penetrates at least a part of the lid base, the air channel includes a first end facing the rotary venting rod and a second end that is distal from the lid base, wherein the swivel cover is arranged in a position relative to the lid base so that it is rotatable to provide a vented state for the lid and a sealed state for the lid, in the vented state, at least a portion of the venting slot of the rotary venting rod is in fluid communication with the air channel, and thereby allows the air channel to communicate with the environment via the venting slot;

in the sealed state, the venting slot of the rotary venting rod is not in fluid communication with the air channel, and the first end of the air channel is sealed by the outer surface of the rotary venting rod.

The lid provides the venting function using a structure that is simple to be implement.

According to a preferred embodiment of the lid of the present invention, the lid base and the swivel cover of the lid are detachable from each other. Such an arrangement facilitates the separation of the air channel and the rotary venting rod, thereby facilitating maintenance and cleaning of the venting device.

According to a preferred embodiment of the lid of the present invention, the rotary venting rod is configured to be rotatable with the swivel cover relative to the lid base from a closed position to an open position via an intermediate position, or from an open position to a closed position via an intermediate position, wherein in the closed position and the open position, the lid is in the sealing state, and in the intermediate position, the lid is in the venting state. The movement of the lid and the venting device are linked so as to allow the venting device to be operated to achieve its function synchronously when the lid is opened to access the contents of the container.

According to a preferred embodiment of the lid of the present invention, the rotary venting rod is detachably affixed to the swivel cover. The detachability of the rotary venting rod is convenient for maintenance and cleaning of the rotary venting rod, especially the venting slot thereof, so as to prolong the service life of the venting device.

According to a preferred embodiment of the lid of the present invention, the rotary venting rod extends from the inner wall of the swivel cover into the inner space enclosed by the swivel cover. The rotary venting rod thus arranged may be better protected by the lid, so as to avoid the adverse contaminating influence of the external environment on the venting device.

According to a preferred embodiment of the lid of the present invention, the outer surface of the rotary venting rod is cylindrical and the rotation axis of the rotary venting rod is its central axis. The rounded outer surface facilitates smooth rotation of the rotary venting rod, thereby improving the operating comfort of the venting device. In addition, the circular outer surface facilitates the sealing effect in the sealed state.

According to a preferred embodiment of the lid of the present invention, the venting slot extends in the longitudinal direction of the rotary venting rod to the distal face of the rotary venting rod in the rotary venting rod. The venting slot thus arranged may be more fully in contact with the ambient air, and provide a sufficiently long air flow path to prevent the contents of the container from being splashed into the ambient air through the air channel and the venting slot.

According to a preferred embodiment of the lid of the present invention, the venting slot extends along a part of the longitudinal direction of the rotary venting rod on the outer surface of the rotary venting rod. This arrangement of the venting slot is beneficial to form a relatively closed air channel, so as to ensure that the contents of the container remain sanitary and contaminated by the external environment.

According to a preferred embodiment of the lid of the present invention, the rotary venting rod is a hollow rod including an internal cavity that penetrates to a distal face of the rotary venting rod, and the venting slot is recessed from the outer surface to the internal cavity. The internal cavity provides a relatively large air flow section, which facilitates the air flow through the venting slot and the internal cavity to communicate the gas inside and outside the container interior.

According to a preferred embodiment of the lid of the present invention, the rotation axis of the rotary venting rod is arranged substantially perpendicular to the channel axis of the air channel at the first end. The vertically arranged air channel and rotary venting rod are beneficial to reduce the space needed for the venting device and to provide a relatively winding air flow path.

The present invention further provides a container comprising a main body and a lid according to the above, wherein the main body comprises an inner chamber for containing contents, and the lid may be connected with the container's inner chamber. The lid is engageable with the main body of the container and covers the opening of the main body, wherein:

when the lid is in the sealed state, the inner chamber of the main body is not in fluid communication with the air channel of the lid, so that the inner chamber cannot be in fluid communication with the ambient air through the air channel;

when the lid is in the venting state, the inner chamber of the main body is in fluid communication with the air channel of the lid, so that the inner chamber is in fluid communication with the ambient air through the venting slot.

This container realizes the venting function with a simple structure.

According to a preferred embodiment of the container of the present invention, the lid and the main body of the container are joined to each other by a screw-on connection, which facilitates the installation of the lid onto the main body of the container and the assembly of various structures on the lid.

According to a preferred embodiment of the container of the present invention, the container includes a drinking straw extending into the interior cavity from outside the interior cavity.

According to a preferred embodiment of the container of the present invention, the drinking straw extends through and beyond the lid;

the rotary venting rod is configured to rotate relative to the lid base from a closed position to an open position via an intermediate position, or from an open position to a closed position via an intermediate position with the swivel cover, wherein the closed position and the open position, the lid base is in the sealing state, and in the intermediate position, the lid base is in the ventilating state, and the drinking straw is in the air-tight state with the rotation of the swivel cover, switching between its sealed state and its open state;

when the rotary venting rod is rotated to the closed position, the drinking straw is blocked by the swivel cover of the lid base and is in the sealed state;

when the rotary venting rod is rotated to the open position, the swivel cover of the lid base releases the drinking straw to its open state.

To sum up, the beneficial effects of the venting device, the lid base and the container including the lid base according to the present invention are at least as follows: various functions of the venting device may be realized with a simple structure, and the sanitariness of the inner chamber of the container may be ensured. The lid may be easily disassembled and reassembled, which also facilitates maintenance and cleaning of the lid itself and the vent.

It is to be understood that both the foregoing general description and the following detailed description illustrate various embodiments and are intended to provide an overview or framework for understanding the nature and characteristics of the claimed subject matter. This document includes figures to provide further understanding of the various embodiments. The accompanying drawings are incorporated into and constitute a part of this specification. The drawings illustrate various embodiments described herein, and together with the written description serve to explain the principles and operations of the claimed subject matter.

BRIEF DESCRIPTION OF THE DRAWINGS

With reference to the above-described objects, the technical features of the present invention are hereinafter described, and the advantages thereof will be apparent from the following detailed description with reference to the accompanying drawings, which illustrate preferred embodiments of the present invention by way of example and do not limit the invention.

DETAILED DESCRIPTION

Figure 1:
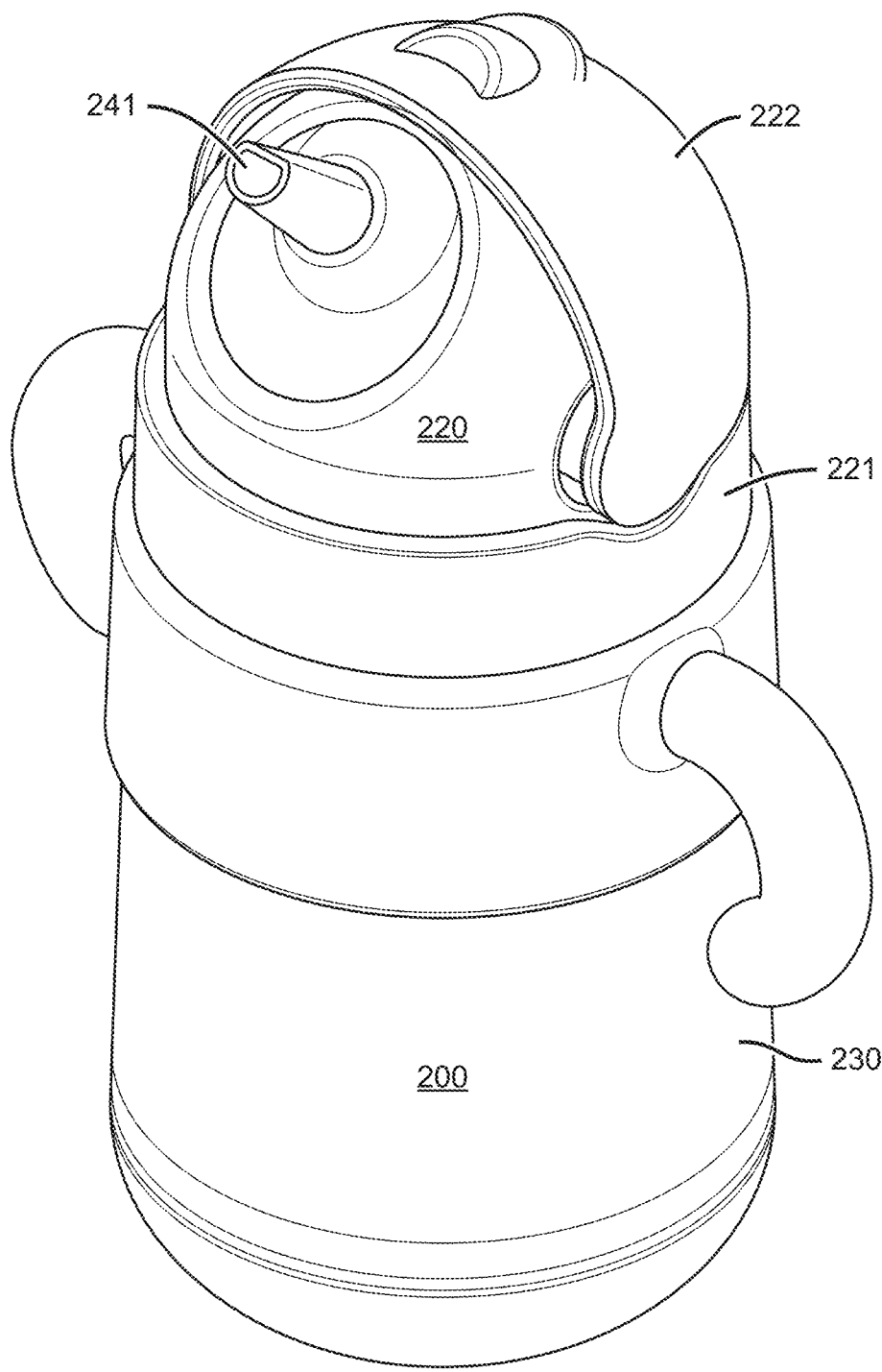
FIG. 1 is a perspective view of a container comprising a preferred embodiment of a venting device according to the present invention.
Figure 2:
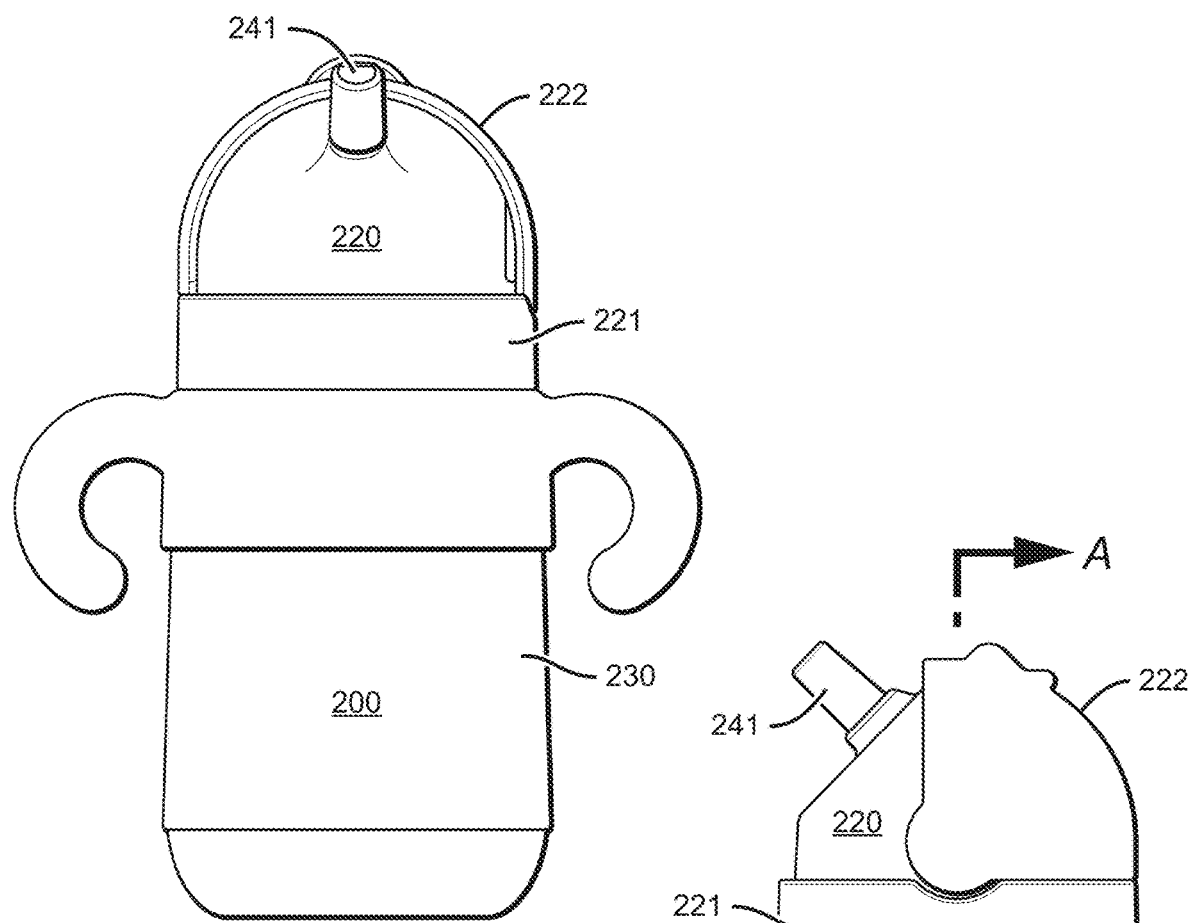
FIG. 2 is a front view of the container shown in FIG. 1.
Figure 3:
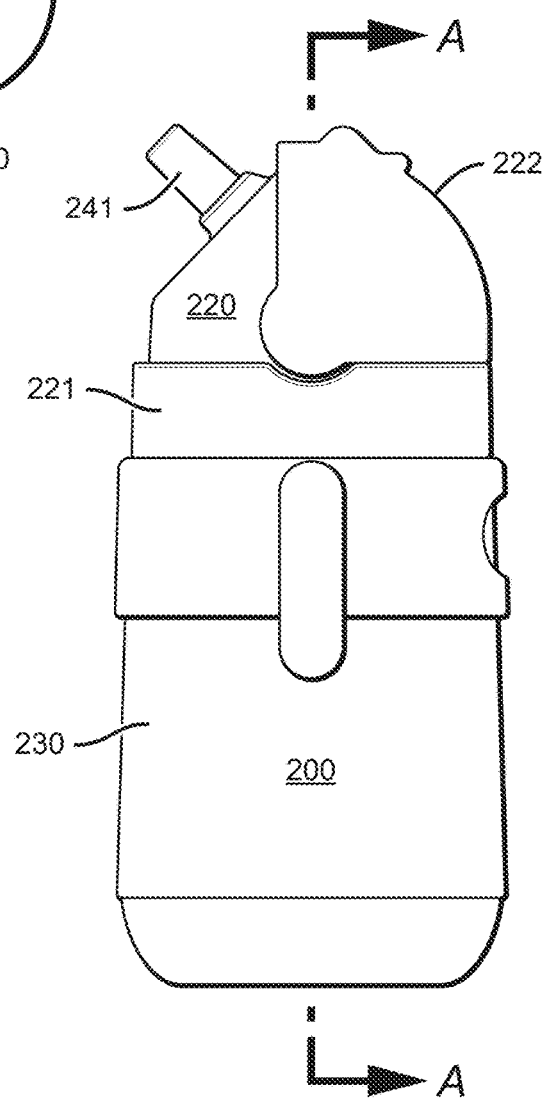
FIG. 3 is a side view of the container shown in FIG. 1.

The following is a list of reference numerals used in the figures and description:

| | |
|---|---|
| 100 | venting device |
| 110 | air channel |
| 111 | first end |
| 112 | second end |
| 113 | channel axis |
| 120 | rotary venting rod |
| 121 | venting slot |
| 122 | distal face |
| 123 | outer surface |
| 124 | rotation axis |
| 125 | internal cavity |
| 200 | container |
| 210 | inner chamber |
| 220 | lid |
| 221 | lid base |
| 222 | swivel cover |
| 222A | rotating shaft |
| 222B | guiding member |
| 223 | protrusion |
| 230 | main body |
| 231 | opening |
| 240 | drinking opening |
| 241 | drinking straw |

Reference will now be made in detail to the embodiments of the present invention, examples of which are illustrated in the accompanying drawings and described hereinafter. While the invention will be described in conjunction with exemplary embodiments, it will be appreciated that this description is not intended to limit the invention to those exemplified embodiments. On the contrary, the invention is directed not only the exemplary embodiments, but also various alternatives, modifications, equivalents, and other embodiments, which may be included within the spirit and scope of the invention. For ease of explanation and precise definition of the technical solutions of the present invention, the terms "upper", "lower", "inner", and "outer" are used to refer to the positions of features of the exemplary embodiments shown in the accompanying drawings to refer to these features describe.

Exemplary embodiments of the present invention will be described in detail below with reference to the accompanying drawings.

A venting device 100 for a container 200 according to a preferred embodiment of the present invention is shown in FIGS. 1-5.

In this context, the term "venting device" is to be understood as a device that enables the gas in one space to be in fluid communication with the gas in another space so that the gas pressure in the two spaces is equalized. Generally, the power source for the venting device to circulate the gas may be provided by the pressure difference of the gas in different spaces, but the active pumping or auxiliary pumping of the gas between the different spaces may also be performed by using an external power source such as an air pump.

Furthermore, although a particular form of container 200 is shown in the drawings as a drinking cup for children (duckbill cup), the venting device of the present invention may also be used in various other types of containers 200, such as drinking cups, insulated bottles, lunch boxes, etc.

Figures 4, 5:
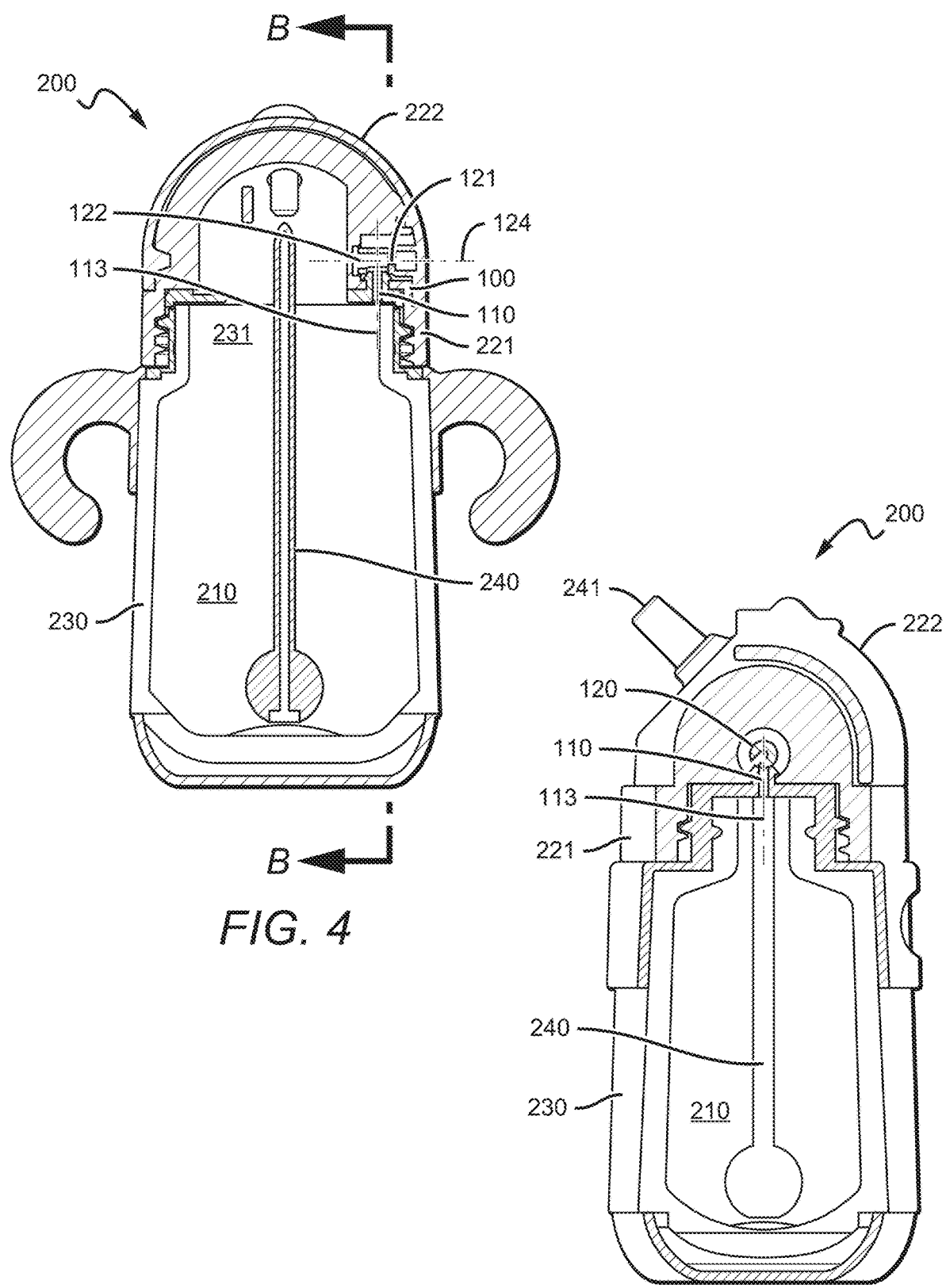
FIG. 4 is a cross-sectional view of the container shown in FIG. 1 taken along line A-A in FIG. 3.
FIG. 5 is a cross-sectional view of the container shown in FIG. 1 taken along the line B-B in FIG. 4.

As shown more clearly in FIG. 4 and FIG. 5, the container 200 comprises an inner chamber 210 for holding contents such as fluids and gases. The inner chamber 210 may be symmetrical about a center axis or may be of other irregular shapes. Preferably, the inner chamber 210 may have shape that tapers toward the top.

Figure 10:
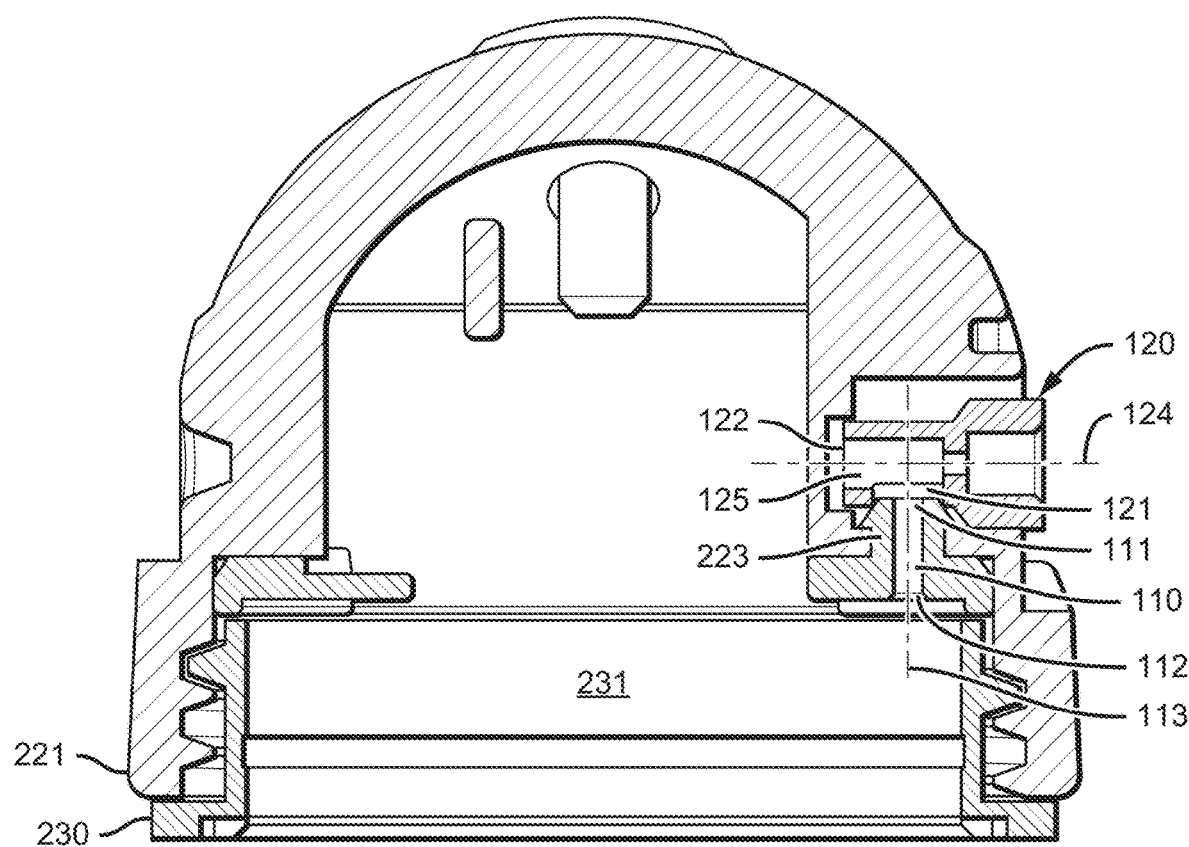
FIG. 10 is a cross-sectional view of a portion of the lid of the second preferred embodiment shown in FIG. 7 and of a portion of the main body of the container to which the lid is affixed, which shows the specific matching relationship between the rotary venting rod and the air channel.

With reference to FIGS. 1-5, the container 200 may include a lid 220 and a main body 230. The lid 220 is engaged with the main body 230 to cover the opening 231 of the main body 230. Preferably, the lid 220 and the main body 230 are engaged with each other by a screw-on connection, as shown in FIGS. 4,5 and 10. Additionally or alternatively, the lid 220 and the main body 230 may also be connected to each other in other detachable ways. One or more parts of the lid 220 (such as the lid base 221 described below) may also be non-detachably connected to the body 230.

In the embodiment shown in the drawings, the lid 220 comprises a lid base 221 and a swivel cover 222 pivotally mounted on the lid base 221, wherein the swivel cover 222 rotates (pivots) with respect to the lid base 221 about an axis perpendicular to the longitudinal axis of the inner chamber 210 (extending in the up-down direction in FIGS. 1 to 5), but the swivel cover 222 may also be made to rotate in other directions relative to the lid base 221, for example, around the longitudinal axis of the inner chamber 210. The swivel cover 222 can have different shapes. Preferably, the swivel cover 222 may be a curved shell-like structure, e.g., part of a spherical surface, as shown in the drawings. Generally, the swivel cover 222 is configured to enclose an interior space in which, for example, a portion of the lid base 221 and/or one or more components making up the venting device 100 may be accommodated. The swivel cover 222, for example, on the inner wall of the swivel cover 222, may be provided with structures coordinating with the lid base 221, such as a rotating shaft 222A and a guiding member 222B (see, for example, FIGS. 6 to 8), in order to facilitate the rotation of the swivel cover 222 relative to the lid base 221. The guiding member 222B may comprise a plurality of concentrically arranged arc-shaped protrusions as shown in the figures to provide a pivot structure in cooperation with complementary arc-shaped grooves (not shown) on the lid base 221. The arc-shaped protrusions may protect the inner space defined by them to a certain extent. In a preferred embodiment, the lid base 221 and the swivel cover 222 are configured such that they are separable from each other. In this disclosure, the lid base 221 and the swivel cover 222 being separable means that they are not integrated, but rather that one of the lid base 221 and the swivel cover 222 may be disassembled independently from the other.

Continuing with reference to FIG. 4, the venting device 100 of the present invention includes an air channel 110 and a rotary venting rod 120.

The air channel 110 includes a first end 111 facing the outer surface 123 of the rotary venting rod 120 and a second end 112 facing away from the rotary venting rod 120. The two ends 112 are in fluid communication with the inner chamber 210 of the container 200 for holding the contents. It should be pointed out that the air channel 110 is a pipe-like structure arranged in a solid structure, and the first end 111 and the second end 112 of the air channel 110 described herein actually refer to the openings at the ends of the air channel 110. The air channel 110 may be straight or curved according to need. The diameter of the air channel 110 may be uniform, or may be varied along the longitudinal direction of the air channel 110 according to need, such as increasing, decreasing, increasing first and then decreasing, first decreasing and then increasing, and so on.

Figure 6:
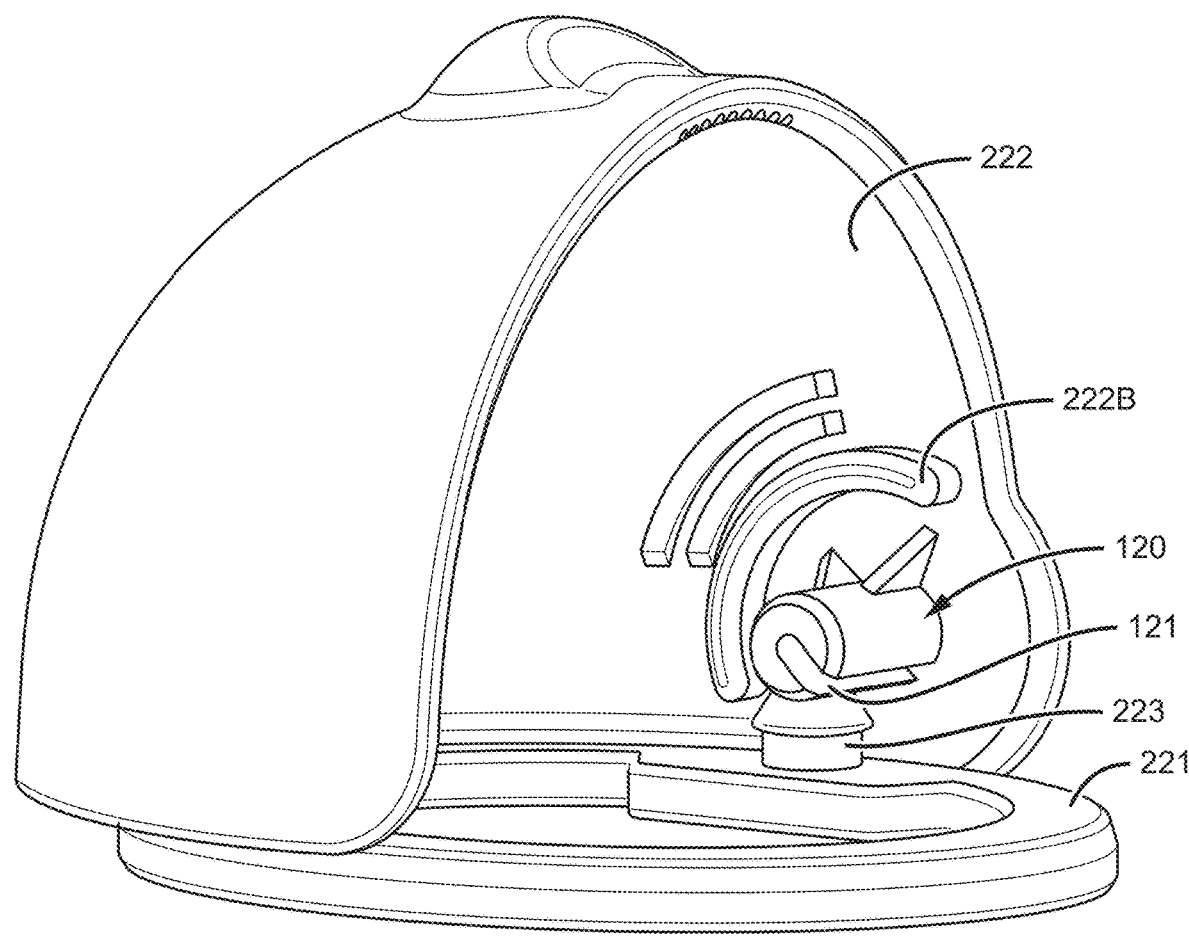
FIG. 6 is a perspective view of a portion of a lid comprising a first preferred embodiment of the venting device according to the present invention.

The air channel 110 may be provided on the lid base 221. In the preferred embodiment shown in the drawings (see FIGS. 4, 5, and 6), the lid base 221 includes a side facing inner chamber 210 of the container 200 when it is mounted on the main body 230 of the container 200. As seen in FIG. 6, the lid base 221 may include a protrusion 223 protruding away from the inner chamber 210 of the container 200, and the air channel 110 may be provided at the inner side of the protrusion 223.

As described above, the rotary venting rod 120 has an outer surface 123. This outer surface 123 defines a longitudinal direction and thus a longitudinal rotation axis 124 of the rotary venting rod 120, see for example FIGS. 4 and 9. Preferably and as shown in the drawings, the outer surface 123 of the rotary venting rod 120 is cylindrical and the rotation axis 124 of the rotary venting rod 120 is its central axis. However, particularly in the case where the rotary venting rod 120 is made of an elastic material, the rotary venting rod 120 may have an outer surface 123 having other shapes, such as oval, elliptical, polygonal, star-shaped, etc. The first end 111 of the air channel 110 may preferably engage directly with the outer surface 123 of the rotary venting rod 120, and more preferably have a shape complementary to the shape of the outer surface 123 of the rotary venting rod.

Figure 7:
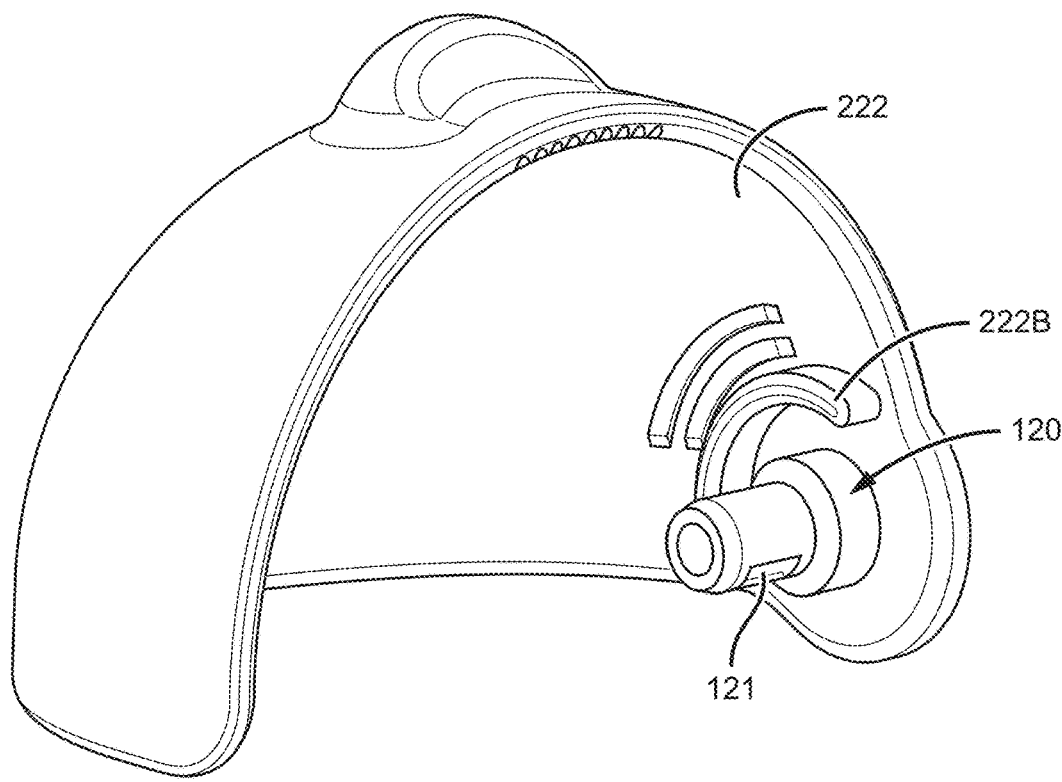
FIG. 7 is a perspective view of a portion of a lid comprising a second preferred embodiment of the venting device according to the present invention.
Figure 8:
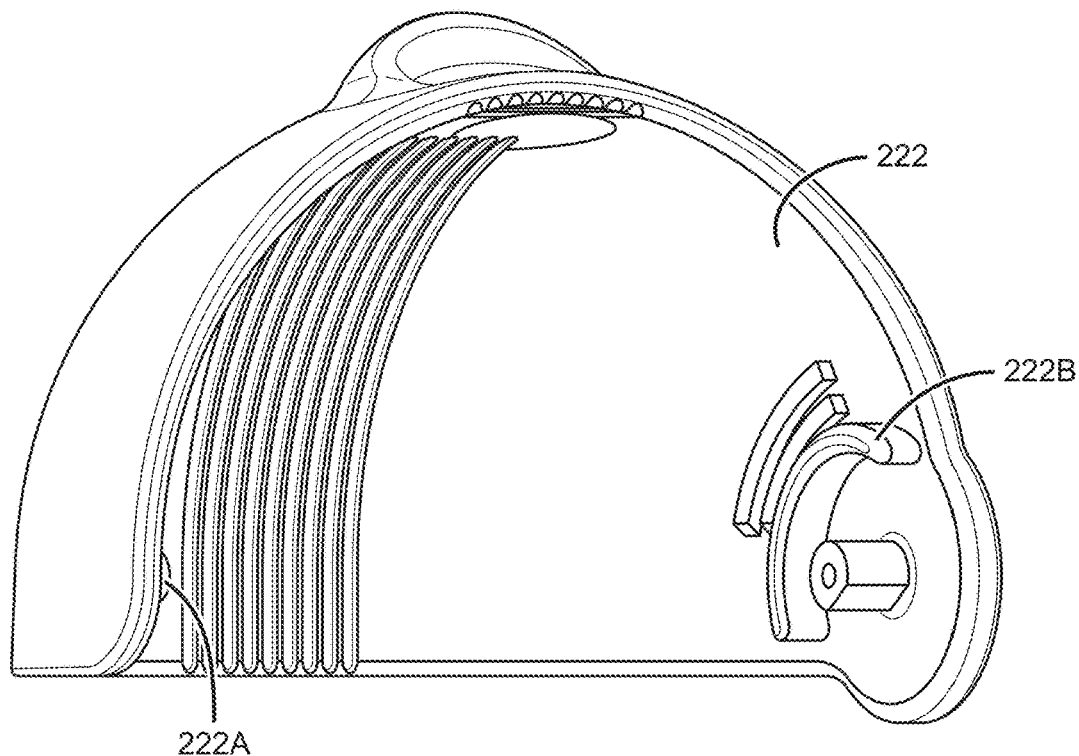
FIG. 8 is a perspective view of the lid of the second preferred embodiment shown in FIG. 7 with the rotary venting rod removed.
Figure 9:
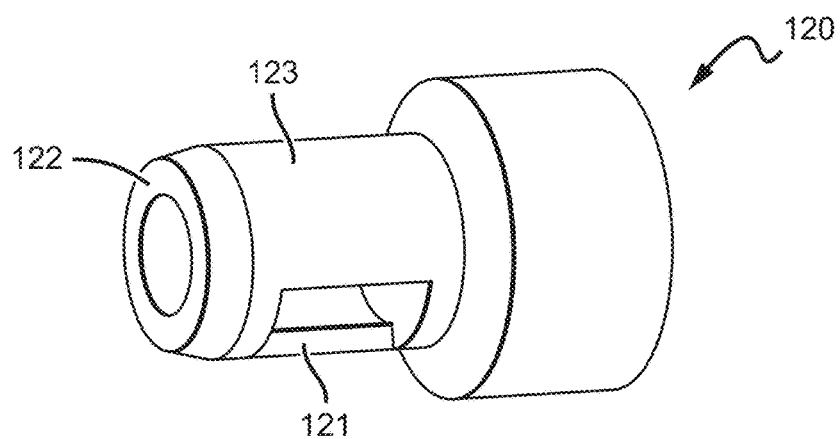
FIG. 9 is a perspective view of the rotary venting rod removed from the lid of the second preferred embodiment shown in FIG. 7.

In the preferred embodiment shown in FIGS. 7 to 9, the rotary venting rod 120 is detachably provided on the container 200, for example, on the swivel cover 222 of the lid 220. The detachable arrangement includes, for example, screw-on or snap-fitting.

Preferably, as shown in the drawings, the rotation axis 124 of the rotary venting rod 120 is arranged to be substantially perpendicular to the channel axis 113 of the air channel 110 at the first end 111. Substantially perpendicular means that the angle where the two intersect is approximately equal to 90 degrees, such as 90°±5°.

Referring to the rotary venting rod of the first preferred embodiment shown in FIG. 6 and the rotary venting rod of the second preferred embodiment shown in FIGS. 7-9, in these two embodiments, the outer surface 123 of the rotary venting rod 120 is provided with a venting slot 121 that is recessed and in fluid communication with ambient air outside the inner chamber 210 (see FIG. 4).

In the two embodiments shown, see, e.g., FIGS. 6 and 7, the venting slot 121 may extend within the rotary venting rod 120 along the longitudinal direction of the rotary venting rod 120 to the distal face 122 of the rotary venting rod 120.

Further preferably, as in the second embodiment shown in FIGS. 7 to 9, the venting slot 121 extends along a part of the longitudinal direction of the rotary venting rod 120 on the outer surface 123 of the rotary venting rod 120. In other words, the venting slot 121 may not extend along the entire longitudinal length of the outer surface 123 of the rotary venting rod 120, but is only recessed on a section of the outer surface 123.

As also shown in FIGS. 7 and 9 and best shown in FIG. 10, the rotary venting rod 120 may preferably be hollow and including an internal cavity 125. The above-mentioned internal cavity 125 penetrates to the distal face 122 of the rotary venting rod 120, and the venting slot 121 is recessed into the internal cavity 125 from the outer surface 123.

The swivel vent rod 120 can swivel about a rotation axis 124 extending longitudinally thereof to toggle the inner chamber 210 of the container 200 between a vented state and a sealed state, which are as follows:

In the vented state, at least a portion of the venting slot 121 of the rotary venting rod 120 is in fluid communication with the air channel 110 and enables the inner chamber 210 of the container 200 to also pass through the air channel 110 and the vent slot 121 to be in fluid communication with the outside ambient air.

In the sealed state, the venting slot 121 of the rotary venting rod 120 is not in fluid communication with the air channel 110 and causes the first end 111 of the air channel 110 to be sealed by the outer surface 123 of the rotary venting rod 120. In other words, in the sealed state, the opening of the air channel 110 at the first end 111 is closed by the outer surface 123 of the rotary venting rod 120, blocking communication with the outside ambient air.

In the above-described exemplary preferred embodiment, the rotary venting rod 120 is provided on the swivel cover 222, and the air channel 110 is provided on the lid base 221. Therefore, the rotary venting rod 120 can rotate relative to the air channel 110 with the rotation of the swivel cover 222 relative to the lid base 221. Further preferably, the rotary venting rod 120 may be arranged on the inner side of the swivel cover 222 to rotate together with the swivel cover 222 around the rotation axis 124. At this time, the venting slot 121 may also lead to the interior space covered by the swivel cover 222.

Figure 11A:
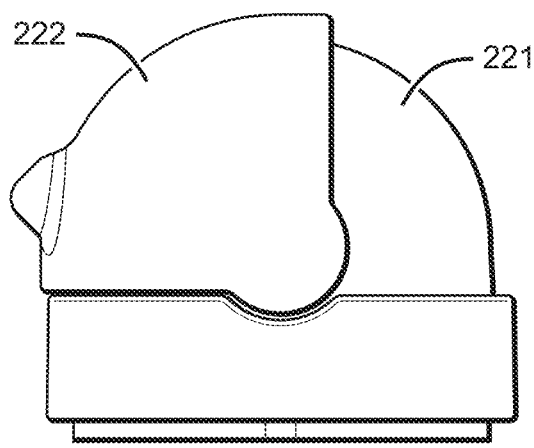
FIG. 11A is a side view of a lid comprising a venting device according to the present invention, wherein the swivel cover of the lid is in a closed position.
Figure 11B:
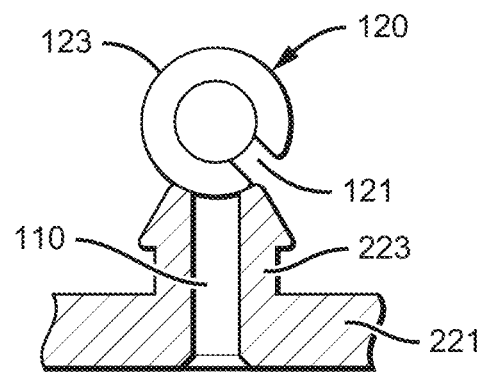
FIG. 11B is a close-up side view of the venting device when the lid is in the closed position as shown in FIG. 11A.
Figure 11C:
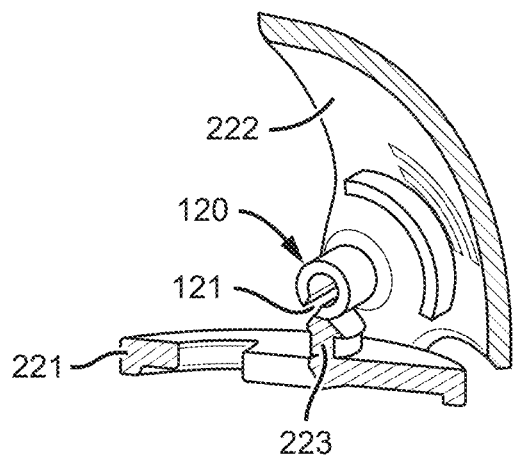
FIG. 11C is a perspective cross-sectional view of a portion of the lid of the second preferred embodiment shown in FIG. 7 when the lid is in the closed position as shown in FIG. 11A.
Figure 12A:
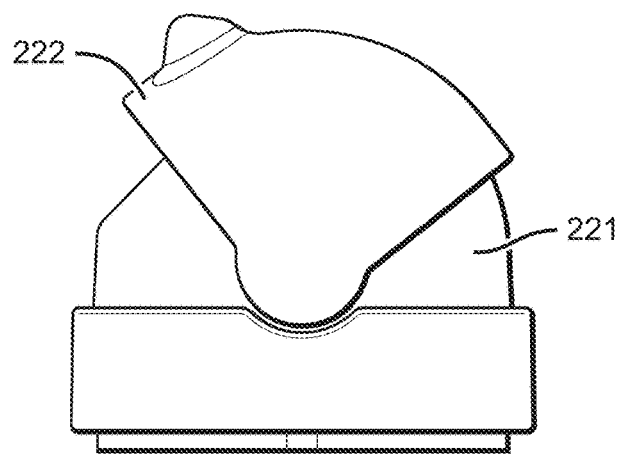
FIG. 12A is a side view of the lid shown in FIG. 11A, wherein the swivel cover of the lid is in an intermediate position.
Figure 12B:
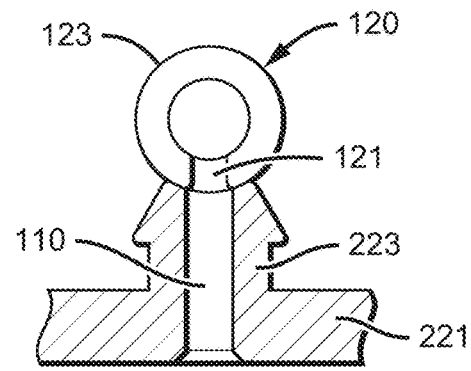
FIG. 12B is a close-up side view of the venting device when the lid is in the intermediate position as shown in FIG. 12A.

In this preferred embodiment, the swivel cover 222 of the lid 220 and the lid base main body 221 may be configured such that:

1) When the swivel cover 222 is fully closed (i.e., the closed position), the venting device 100 is in a sealed state (refer to FIGS. 11A-11C). The venting slot 121 of the rotary venting rod 120 and the lid base 221 of the base 220, specifically, the air channel 110 in the protrusion 223, are offset from each other (for example, refer to FIG. 11B), and the outer surface 123 of the venting rod 120 is rotated to cover one end of the air channel 110 to seal the air channel 110;

2) When the swivel cover 222 is rotated through a certain angle and partially but not fully opened (i.e., the intermediate position), the venting device 100 is in the venting state (refer to FIGS. 12A-12C), at this time, the venting slot 121 of the rotary venting rod 120 is aligned with the air channel 110 provided in the lid base 221 of the lid 220, specifically in the protrusion 223 (for example, refer to FIG. 12B);

And optionally 3) when the swivel cover 222 continues to rotate through a certain angle and is fully opened (i.e., the open position), the venting device 100 is again in a sealed state (refer to FIGS. 13A-13C), thus, the venting slot 121 of the rotary venting rod 120 provided on the swivel cover 222 of the lid 220 is again offset from air channel 110, specifically the protrusion 223 (e.g., see FIG. 13B), and the outer surface 123 of the rotary venting rod 120 once again covers one end of the air channel 110 to seal the air channel 110.

Figure 12C:
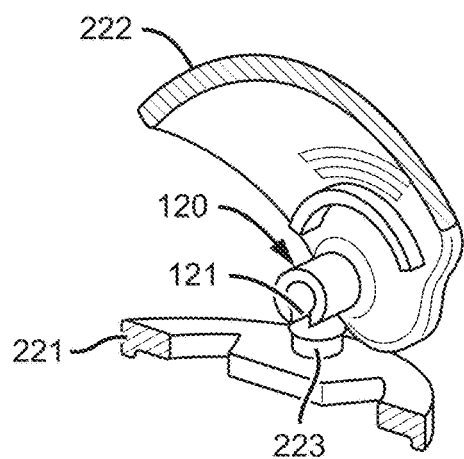
FIG. 12C is a perspective cross-sectional view of a portion of the lid of the second preferred embodiment shown in FIG. 7 when the lid is in the intermediate position as shown in FIG. 12A.

The rotary venting rod 120 shown in FIGS. 11C, 12C, and 13C again depict the second embodiment shown in FIGS. 7-9 and discussed above, wherein the venting slot 121 extends over a portion of the length of the rotary venting rod 120. Of course, the venting slot 121 may also extend through the entire length of the rotary venting rod 120. In FIGS. 11C, 12C, and 13C, the venting slot 121 has a substantially circular cross-section within the rotary venting rod 120. It will be appreciated that the vent slot may also be configured to have a generally rectangular cross-section. Although the specific embodiments of the rotary venting rod of the present invention may be different, the matching relationship between the venting slot 121 and the air channel 110 remains similar to each other. For example, the above-mentioned correspondence between the venting slot 121 and the air channel 110 may be seen in the operation process shown in FIGS. 11B, 12B, and 13B.

Figure 13A:
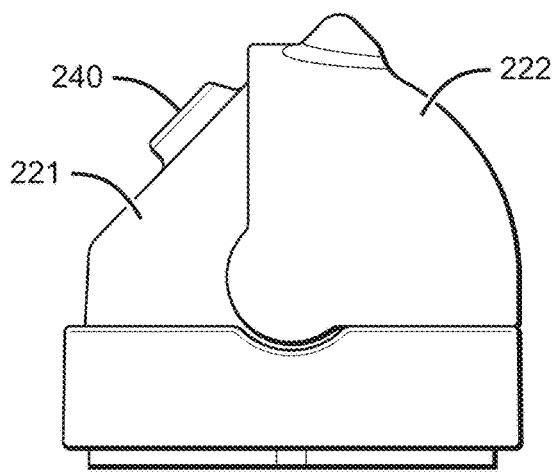
FIG. 13A is a side view of the lid shown in FIG. 11A, wherein the swivel cover of the lid is in an open position.
Figure 13B:
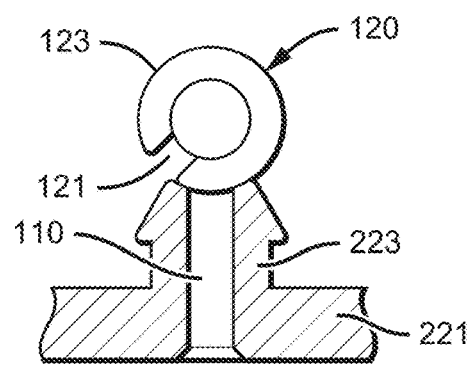
FIG. 13B is a close-up view of the venting device when the lid is in the open position as shown in FIG. 13A.
Figure 13C:
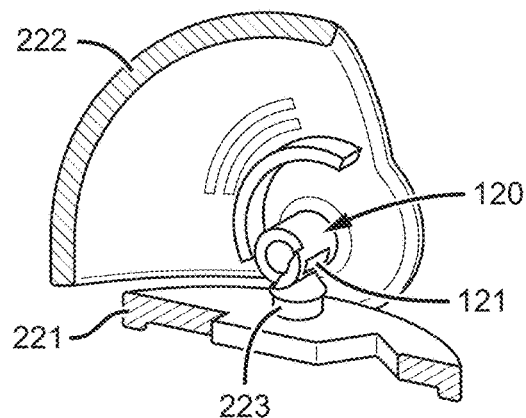
FIG. 13C is a perspective cross-sectional view of a portion of the lid of the second preferred embodiment shown in FIG. 7 when the lid is in the open state as shown in FIG. 13A.

Referring to FIG. 13A, it shows the drinking opening 240 provided on the lid base 221 of the lid 220 of the container 200, which is exposed because it is not covered by the swivel cover 222 being in the opened state. As shown in FIGS. 11A, 12A, and 13A (in FIGS. 11A and 12A the drinking opening 240 is not exposed because it is blocked by the swivel cover 222), the drinking opening 240 may be configured as follows.

When the swivel cover 222 of the lid 220 is completely closed (closed position, FIG. 11A), the drinking opening 240 (covered by the swivel cover 222 in FIG. 11A) is in a sealed state and completely covered by the swivel cover 222 of the lid 220. At this time, the user cannot access the contents of the container 200 through the drinking opening 240.

When the swivel cover 222 is partially opened but not fully opened (intermediate position, FIG. 12A), the drinking opening 240 (covered by the swivel cover 222 in FIG. 12A) is still completely covered by the swivel cover 222 of the lid 220. At this time, the user still cannot access the contents of the container 200 through the drinking opening 240, as the drinking opening 240 is still in a sealed state.

When the swivel cover 222 is fully opened (open position, FIG. 13A), the swivel cover 222 is fully rotated to one side of the lid 220, so that the drinking opening 240 located on the opposite side of the lid 220 is exposed. At this time, the user can access the contents of the container 200 through the drinking opening 240 (the connection structure between the contents of the container and the drinking opening 240 is not the focus of the present invention, so such details are omitted from this disclosure) as the drinking opening 240 is in an open state.

In addition, in a preferred embodiment, the container 200 may further include other structures to facilitate drinking at the drinking opening 240. For example, referring back to FIGS. 1-5, the container 200 may also preferably include a drinking straw 241 extending into the inner chamber 210 from outside the inner chamber 210. The drinking straw 241 may be in the form of a drinking straw extending through and beyond the lid 220, or may be other common suction aids. The drinking straw 241 may be flexible, for example, to be sealed by being bent and deformed by an external force, and to be opened by virtue of the recovery properties of the drinking straw material itself when the external force is removed. Alternatively, the drinking straw 241 may also be elastically retractable, so as to be retracted into the container 200 under the action of an external force to be sealed, and elastically extend when the external force is removed. The drinking straw 241 may be opened or closed using methods common in the art, such as by the movement of the swivel cover 222 relative to the lid base 221 to open and close the drinking straw 241.

Preferably, the drinking straw 241 may be configured as follows.

When the swivel cover 222 of the lid 220 is completely closed (closed position), the drinking straw 241 is bent or pressed in by the force of the swivel cover 222. The venting slot 121 of the rotary venting rod 120 is not in fluid communication with the air channel 110, and the first end 111 of the air channel 110 is sealed by the outer surface 123 of the rotary venting rod 120, so the inner chamber 210 of the container 200 cannot communicate with the external ambient air through the air channel 110. At this time, the drinking opening 240 is completely blocked by the swivel cover 222 and is in a sealed state; at this time, the drinking straw 241 cannot be used.

When the swivel cover 222 rotates to the intermediate position, the swivel cover 222 is partially but not fully opened, and at least a part of the drinking straw 241 is also bent or pressed in by the force of the swivel cover 222. Rotation of the rotary venting rod 120 with the rotation of the swivel cover 222 causes at least a portion of the venting slot 121 to be in fluid communication with the air channel 110, thereby placing the inner chamber 210 of the container 200 in fluid communication with the with the ambient air through the air channel 110 and venting slot 121, so as to equalize the external air pressure and the internal pressure of the inner chamber 210. At this time, the drinking opening 240 is still sealed by the swivel cover (222) and is in a sealed state, so at this time, the drinking straw 241 cannot be used.

When the swivel cover 222 is rotated to the open position, since the swivel cover 222 is completely rotated to one side of the lid 220 and is out of contact with the drinking straw 241, the drinking straw 241 returns to an accessible configuration. The rotary venting rod 120 is rotated until the venting slot 121 is again out of fluid communication with the air channel 110, and the first end 111 of the air channel 110 is sealed by the outer surface 123 of the rotary venting rod 120. The inner chamber 210 of the container 200 cannot communicate with the external ambient air through the air channel 110, but the swivel cover 222 releases the drinking straw 240 so that the drinking straw 240 is in an open state, allowing access to the liquid beverage contained in the inner chamber 210 of the container 200.

The preferred embodiments of the present invention have been described in detail above, but it is to be understood that aspects of the embodiments may be modified, if desired, to employ aspects, features and concepts of various patents, applications and publications to provide additional embodiments without departing from the spirit and scope of the invention.

These and other changes may be made to the embodiments in light of the above detailed description. In general, in the claims, the terms used should not be construed as limiting to the specific embodiments disclosed in the specification and the claims, but should be construed to include all possible embodiments, along with all equivalents to which these claims are entitled scope.

What is claimed is:

1. A venting device, characterized in that the venting device comprises an air channel and a rotary venting rod, wherein:
    the air channel comprises a first end facing an outer surface of the rotary venting rod and a second end facing away from the rotary venting rod;
    the outer surface of the rotary venting rod is provided with a recessed venting slot which is in fluid communication with ambient air and the venting slot extends along the rotary venting rod in the longitudinal direction of the rotary venting rod to a distal face of the rotary venting rod, and the rotary venting rod may be swiveled about a rotation axis extending along its longitudinal direction to provide vented and sealed states, wherein:
    in the vented state, the venting slot of the rotary venting rod is in fluid communication with the air channel and the air channel is in fluid communication with the ambient air via the venting slot; and
    in the sealed state, the venting slot of the rotary venting rod is not in fluid communication with the air channel and the first end of the air channel is sealed by the outer surface of the rotary venting rod.

2. The venting device according to claim 1, further characterized in that the first end of the air channel and the outer surface of the rotary venting rod are separable from each other.

3. The venting device according to claim 1, further characterized in that the outer surface of the rotary venting rod is cylindrical, and the rotation axis of the rotary venting rod is its central axis.

4. A venting device, characterized in that the venting device comprises an air channel and a rotary venting rod, wherein:
    the air channel comprises a first end facing an outer surface of the rotary venting rod and a second end facing away from the rotary venting rod;
    the outer surface of the rotary venting rod is provided with a recessed venting slot which is in fluid communication with ambient air and the venting slot extends along a portion of the outer surface of the rotary venting rod in the longitudinal direction of the rotary vending venting rod, and the rotary venting rod may be swiveled about a rotation axis extending along its longitudinal direction to provide vented and sealed states, wherein:
    in the vented state, the venting slot of the rotary venting rod is in fluid communication with the air channel and the air channel is in fluid communication with the ambient air via the venting slot; and
    in the sealed state, the venting slot of the rotary venting rod is not in fluid communication with the air channel and the first end of the air channel is sealed by the outer surface of the rotary venting rod.

5. The venting device according to claim 4, further characterized in that the rotary venting rod comprises an internal cavity extending toward the distal face of the rotary venting rod and the venting slot is recessed into the internal cavity from the outer surface.

6. The venting device according to claim 1, further characterized in that the rotation axis of the rotary venting rod is arranged at the first end of the air channel and is substantially perpendicular to the channel axis of the air channel.

\* \* \* \* \*